United States Patent
Pinchok, Jr. et al.

[11] Patent Number: 5,886,321
[45] Date of Patent: Mar. 23, 1999

[54] ARRANGEMENT FOR HEATING THE WIPER REST AREA OF A VEHICLE WINDSHIELD

[75] Inventors: Robert N. Pinchok, Jr., New Kensington; Beth C. Ramsey, Mars, both of Pa.

[73] Assignee: PPG Industries, Inc., Pittsburgh, Pa.

[21] Appl. No.: 769,913

[22] Filed: Dec. 19, 1996

[51] Int. Cl.⁶ ........................................... H05B 3/26
[52] U.S. Cl. .................... 219/203; 219/522; 219/523; 219/543
[58] Field of Search ................... 219/203, 522; 214/203; 156/106; 426/212

[56] References Cited

U.S. PATENT DOCUMENTS

| | | | |
|---|---|---|---|
| 3,729,616 | 4/1973 | Gruss et al. | 219/522 |
| 3,745,309 | 7/1973 | Gruss | 219/522 |
| 3,752,348 | 8/1973 | Dickason et al. | 219/522 |
| 4,017,661 | 4/1977 | Gillery | 428/412 |
| 4,057,671 | 11/1977 | Shoop | 428/208 |
| 4,078,107 | 3/1978 | Bitterice et al. | 428/38 |
| 4,086,594 | 4/1978 | Kropielnicki et al. | 219/522 |
| 4,109,133 | 8/1978 | Hänle et al. | 219/203 |
| 4,196,338 | 4/1980 | Edel | 219/522 |
| 4,321,296 | 3/1982 | Rougier | 428/212 |
| 4,361,751 | 11/1982 | Criss et al. | 219/203 |
| 4,373,130 | 2/1983 | Krasborn et al. | 219/203 |
| 4,378,484 | 3/1983 | Kunert | 219/203 |
| 4,395,622 | 7/1983 | Dran et al. | 219/522 |
| 4,436,575 | 3/1984 | Dran et al. | 156/433 |
| 4,513,196 | 4/1985 | Bartelsen et al. | 219/203 |
| 4,613,530 | 9/1986 | Hood et al. | 428/34 |
| 4,645,146 | 2/1987 | Hall | 244/129.3 |
| 4,721,636 | 1/1988 | Hood et al. | 219/522 |
| 4,725,710 | 2/1988 | Ramus et al. | 219/203 |
| 4,902,875 | 2/1990 | Koontz | 210/203 |
| 4,910,380 | 3/1990 | Reiss et al. | 219/203 |
| 4,971,848 | 11/1990 | Ruelle et al. | 219/203 |
| 5,070,230 | 12/1991 | Osada et al. | 219/203 |
| 5,099,104 | 3/1992 | Holzer et al. | 219/203 |
| 5,173,586 | 12/1992 | Gold | 219/203 |
| 5,386,098 | 1/1995 | Knudsen | 219/203 |
| 5,434,384 | 7/1995 | Koontz | 214/203 |
| 5,451,280 | 9/1995 | Gillner | 156/106 |

FOREIGN PATENT DOCUMENTS

| | | |
|---|---|---|
| 2036905 | 8/1991 | Canada . |
| 0 385 785 | 9/1990 | European Pat. Off. . |
| 0 385 791 | 9/1990 | European Pat. Off. . |
| 0 625 422 | 11/1994 | European Pat. Off. . |
| 0 560 677 | 9/1993 | France . |
| 1917080 | 10/1970 | Germany . |
| 150979 | 9/1981 | Germany . |
| 64-70222 | 3/1989 | Japan . |
| 2223385 | 4/1990 | United Kingdom . |

OTHER PUBLICATIONS

Mark's Standard Handbook For Mechanical Engineers, Ninth Edition, by Eugene A. Avallone et al., pp. 15–16 and 15–17.

Tsunemoto, H. et al., "Study of Melting phenomenon of Frost and Ice on the Windshield", JSAE Review 15 (1994) 53–58.

MWS® Wire Industries Catalogue.

*Primary Examiner*—Teresa J. Walberg
*Assistant Examiner*—Vinod D Patel
*Attorney, Agent, or Firm*—A. C. Siminerio

[57] ABSTRACT

The present invention provides a windshield with a heating arrangement to heat the wiper rest area of the windshield. The windshield includes first and second glass sheets secured together by an interlayer. A single, continuous resistance heating wire is secured between the glass sheets and makes multiple passes through a predetermined portion of the windshield generally corresponding to the wiper rest area such that the wire generates a desired power density within the predetermined portion to heat the wiper rest area. Opposing first and second ends of the wire extend to common connection area along an edge of the windshield and a connector secured to the wire ends provides for external electrical access to the wire. The wire may also extend along a marginal edge portion of the windshield generally corresponding to its A-post area. In one particular embodiment of the invention, an opaque ceramic band is bonded to a major surface of the second glass sheet, which forms the inner ply of the windshield, along its marginal edge portion such that the wire is not visible when the windshield is viewed through the second glass sheet. In addition, the wire may include a coating having a color that generally corresponds to the color of the opaque ceramic band to mask the appearance of the wire when the windshield is viewed through the first glass sheet.

26 Claims, 2 Drawing Sheets

ARRANGEMENT FOR HEATING THE WIPER REST AREA OF A VEHICLE WINDSHIELD

BACKGROUND OF THE INVENTION

1. Field of the Invention

The present invention relates to heating selected areas of a laminated transparency, and in particular to an automotive windshield and a method of fabricating an automotive windshield for heating the lower portion of an automotive windshield where the windshield wipers reside when not in use.

2. Technical Considerations

Windshield wipers on motor vehicles typically are positioned along the lower portion of a windshield below the driver's field of vision. In extremely cold weather, it is possible that moisture in the air may freeze the rubber wiper blade to the glass surface of the windshield making the wipers inoperable. The wipers will have to be freed by hand or the vehicle must be heated to melt any ice holding the wipers to the windshield surface.

Several approaches have been used to heat the outer surface of a transparency. In U.S. Pat. No. 3,729,616 to Gruss et al.; U.S. Pat. No. 3,745,309 to Gruss et al.; U.S. Pat. No. 4,057,671 to Shoop; U.S. Pat. No. 4,078,107 to Bitterice et al.; U.S. Pat. No. 4,436,575 to Dran et al. and EP 385785 and 385791 to Lyon et al., the entire laminate is heated by a plurality of wires extending throughout the transparency. The wires are powered by busbars positioned along opposing edges of the transparency. In other arrangements, heat has been concentrated at the wiper rest area, i.e. the portion of the windshield where the wipers reside when deactivated. More particularly, in U.S. Pat. No. 4,373,130 to Krasborn et al., heating elements are positioned along the lower edge of the windshield behind a continuous, opaque heat absorbing layer so that the heating elements are not be visible from the front of the windshield. The elements are powered by busbars positioned along opposing edges of the windshield. In U.S. Pat. No. 5,173,586 to Gold, a metal strip is sealed against the outer surface of a windshield just below the wiper rest area. In U.S. Pat. No. 5,386,098 to Knudsen, a plurality of heating elements are secured to the inner surface of the windshield in the vicinity of the wiper rest area. The heating elements are powered by busbars with connection points at opposite corners of the windshield. In U.S. Pat. No. 5,451,280, electrically conductive ceramic enamel lines are formed behind the opaque ceramic band of the windshield in the wiper rest area. In JP 64-70222, a plurality of electrically conductive heating lines are printed on a major surface of one of the glass plies of a laminated window and extend along the wiper rest area of a laminate between a pair of opposing busbars. Still other heating arrangements include two separate heating systems: one to heat the upper central portion of the transparency and the other to heat the lower area in the vicinity of the wiper rest area. For example, in U.S. Pat. No. 4,109,133 to Hanle et al., upper and lower heating elements are screened on the surface of a rear window of a vehicle. In U.S. Pat. No. 4,971,848 to Ruelle et al., the lower portion heating elements of the heatable panel are screened on the glass surface in a mesh-like pattern. In U.S. Pat. No. 5,434,384 to Koontz, the upper and lower heating elements are transparent, electroconductive film coatings.

In each of these heating systems, the heating elements are either electrically conductive ceramic paints which are applied by a screening process and bonded to the glass surface and/or the heating elements are powered by busbars positioned along opposing edges of the transparency. Such systems require additional glass processing steps in order to incorporate the busbars and/or ceramic elements within the laminate. In addition, when the heating elements or busbars are applied to the glass or a component of the laminated windshield, any defects in the heating element require the glass or component to be scrapped or reworked.

It would be advantageous to provide a system for heating the windshield wiper rest area of a windshield to free the wipers frozen to the windshield that provides maximum flexibility as to the design of the heated area and minimizes any impact on the fabrication of the windshield.

SUMMARY OF THE INVENTION

The present invention provides a windshield with a heating arrangement to heat the wiper rest area of the windshield. The windshield includes first and second glass sheets secured together by an interlayer. A single, continuous resistance heating wire is secured between the glass sheets and makes multiple passes through a predetermined portion of the windshield generally corresponding to the wiper rest area such that the wire generates a desired power density within the predetermined portion to heat the wiper rest area. Opposing first and second ends of the wire extend to a common connection area along an edge of the windshield and a connector secured to the wire ends provides for external electrical access to the wire. The wire may also extend along a marginal edge portion of the windshield generally corresponding to its A-post area. In one particular embodiment of the invention, an opaque ceramic band is bonded to a major surface of the second glass sheet, which forms the inner ply of the windshield, along its marginal edge portion such that the wire is not visible when the windshield is viewed through the second glass sheet. In addition, the wire may include a coating having a color that generally corresponds to the color of the opaque ceramic band to mask the appearance of the wire when the windshield is viewed through the first glass sheet.

DESCRIPTION OF THE INVENTION

The instant invention will be discussed for use with an automotive windshield; however, it should be appreciated that the invention is not limited thereto and may be used with any laminated transparency, and in particular where it is desired to hide the appearance of the heating elements. Furthermore, the invention may be used with transparencies made of any material, such as but not limited to glass, glass ceramic and/or plastic.

Figure 1:
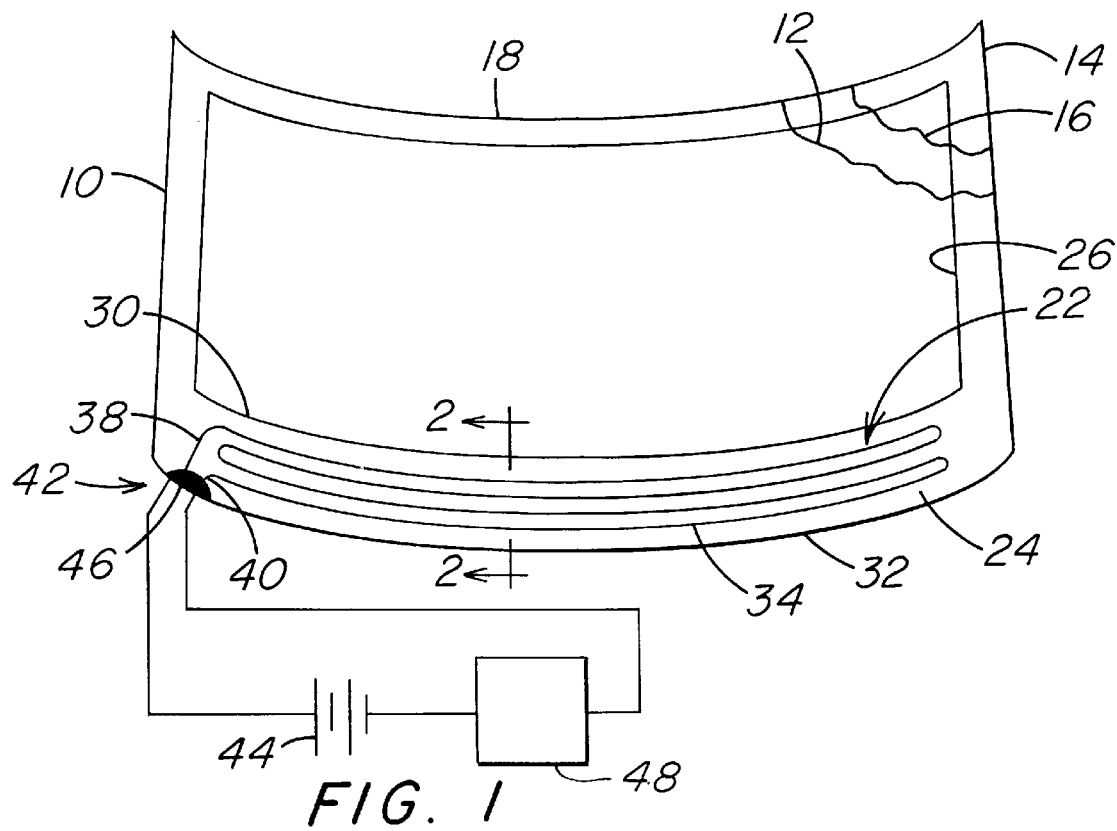
FIG. 1 is a plan view of a windshield with a wiper rest area heating system incorporating features of the present invention.
Figure 2:
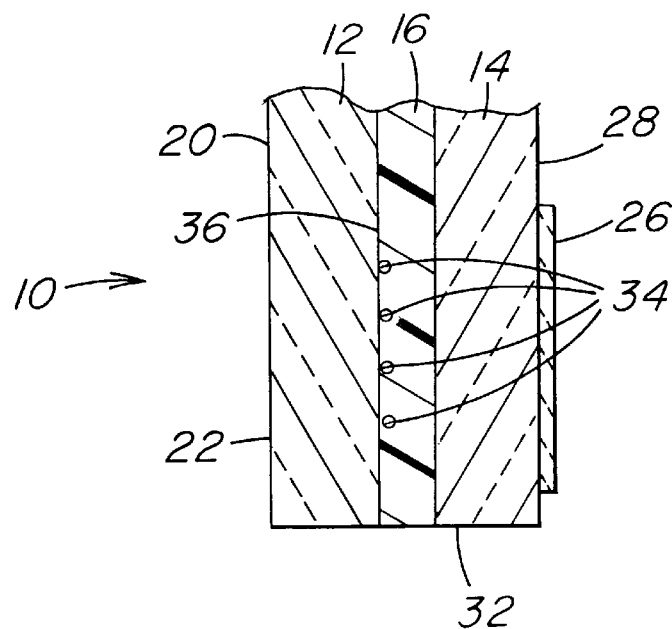
FIG. 2 is a plan view taken along line 2—2 of FIG. 1.

With reference to FIGS. 1 and 2, windshield 10, which incorporates features of the instant invention, includes an outer glass sheet 12, an inner glass sheet 14 and a thermoplastic interlayer 16, for example polyvinyl butyral. The interlayer 16 may include a shade band (not shown) along the upper edge 18 of the windshield 10, as is known in the art. Outer glass sheet 12, inner glass sheet 14 and interlayer 16 are joined together in any convenient manner to form a unitary structure, for example subjecting the assembly to elevated temperatures and pressures to laminate the assembly as is well known to those skilled in the art. The outer glass sheet 12 has an outside surface 20 over which windshield wipers (not shown) are moved in any convenient manner to remove excess moisture such as water, snow, dew and/or ice. When the wipers are deactivated and in a rest position, the wipers generally reside along a lower portion of the windshield 10, hereinafter referred to as the wiper rest area 22.

A wiper area heating arrangement 24, as will be discussed later in more detail, is positioned in the vicinity of the wiper rest area 22 and is laminated between the glass sheets 12 and 14 of windshield 10. An opaque decorative band 26 of a type commonly used in the art is provided on windshield 10 along the marginal edge portions of surface 28 of inner glass sheet 14. Although not limiting in the present invention, the opaque band 26 is typically a black ceramic paste screen printed onto the marginal edge portion of surface 28 of inner sheet 14 and heated during the thermal shaping of the glass sheets to bond the paste to the glass surface 28. The band 26 hides adhesive used to secure the windshield 10 onto the automotive body opening while preventing degradation of the adhesive by solar energy. It is preferred that the portion 30 of the band 26 along the lower edge 32 of windshield 10 be sufficiently wide to extend beyond the wiper area heating arrangement 24, as will be discussed later in more detail, to "hide" the heating elements of arrangement 24.

It should be appreciated that the present invention may be practiced with glass of any composition and further that the glass sheets 12 and 14 and/or interlayer 16 may have coated surfaces to provide additional properties to the windshield. In addition, one or both of the glass sheets may be replaced with other rigid transparent sheets, e.g. plastic.

With continued reference to FIGS. 1 and 2, the wiper area heating arrangement 24 includes a single resistance heating wire 34 incorporated into interlayer 16. As used herein, the term "wire" means a drawn or formed metal thread or filament. The wire 34, which may include a single or multiple strands, has a predetermined resistance per unit of length and is provided at a length sufficient to heat the wiper rest area 22. The wire 34 is incorporated into the interlayer 16 in a desired pattern, either by hand or a robot. More particularly, the wire 34 may be secured to surface 36 of the interlayer 16 using a soldering iron to locally heat and melt the interlayer 16 along the predetermined wire pattern that generally corresponds to the wiper rest area 22. As the interlayer 16 cools, the wire 34 remains secured to the interlayer. It is preferred that the wire 34 extend along surface 36 of interlayer 16 so that the maximum amount of heating from the wire 34 may be directed towards surface 20 of outer sheet 12 to melt any ice formed in the wiper rest area 22. If the possibility of air entrapment along the wire 34 during lamination of the windshield 10 becomes a problem, the wire 34 may be fully embedded within the interlayer 16 just below surface 36.

In the particular embodiment of the invention shown in FIG. 1, wire 34 is configured to heat the wiper rest area 22 along the lower marginal edge portion of windshield 10. This configuration would be typical with a windshield wiper configuration where the wipers move across the windshield 10 in the same direction. With such an arrangement, the wipers generally have a rest position that extends along the lower edge 32 of windshield 10 and do not overlap. For those windshield wiper configurations where the wipers moved in opposite directions, the wipers typically have a rest area positioned in the center of the windshield that overlap each other. As can be appreciated, under certain conditions when the wiper motor (not shown) is temporarily de-energized, the wipers may stop at an intermediate position other than the wiper rest area 22. More specifically, vehicles may have a wiper pulse mode wherein the wipers are automatically energized on a periodic basis. If desired, the present invention may be expanded to heat this additional area to prevent accumulation of snow and ice on the windshield 10.

The discussion now will be directed to the determination of the size and length of the wire 34 required for the wiper area heating arrangement 24 of the present invention. It is preferred that heating arrangement 24 generate a power density of about 0.3 to 1 watts per square inch and preferably about 0.5 to 0.7 watts per square inch. Lower power densities may be used; however, at lower power densities a longer time period is required to melt ice or free the wiper frozen to the windshield 10. At higher power densities, the time period decreases; however, excessive heat may cause delamination of a laminated windshield or edge stresses in the glass sheet. In addition, a higher power density requires more current and therefore will increase the electrical load on the vehicle's power system.

In the practice of the invention, the size and length of the wire 34 used as the heating element may be determined using the following equations:

$$S = P/A \qquad \text{Equation (1)}$$

where:

S is power density generated by a heatable member, and in particular wire 34, within the wiper rest area 22, in watts/square inch;

P is power generated by wire 34 within the wiper rest area, in watts, and

A is area to be heated, i.e. the wiper rest area 22, in square inches.

$$P = VI \qquad \text{Equation (2)}$$

where:

P is as previously defined;

V is the voltage of the power supply, and

I is the current flow through the wire 34, in amperes.

$$V = IR \qquad \text{Equation (3)}$$

where:

V and I are as previously defined, and

R is the total resistance of the wire 34, in ohms.

Equations (1), (2) and (3) are combined to provide Equation (4).

$$S = P/A = VI/A = V^2/AR \qquad \text{Equation (4)}$$

where S, P, A, V, I and R are as previously defined.

Solving for R, Equation (4) becomes Equation (5).

$$R = V^2/AS \qquad \text{Equation (5)}$$

where R, V, A and S are as previously defined.

For purposes of illustration, it is assumed that the wiper rest area 22 to be heated is 3 inches×34 inches (7.62 cm×86.36 cm) or 102 square inches (658.16 sq. cm) and the heating arrangement 24 will include a predetermined pattern formed by multiple passes of wire 34 along the lower portion of the windshield 10 through an area generally corresponding to the wiper rest area 22. Substituting these values into Equation 5 along with V=12 volts (typical car battery) and a desired power density of 0.6 watts per square inch, the required resistance of the wire 34 is about 2.82 ohms. The wire 34 to be selected as the heating element and the length required to produce a total resistance of 2.82 ohms depends on the type of material used for the wire and its cross-sectional area. In the present invention, it is preferred that the wire be copper but other materials, for example, nichrome, stainless steel, nickel, aluminum, zinc, tungsten, gold, silver or other metal and metal alloy wire may be used. In addition, smaller diameter wire is preferred because it is less visible when viewed from the outside of the motor vehicle. Although not limiting in the present invention, it is preferred that the wire size be approximately 28 to 34 gauge (American Wire Gauge (AWG)). The length of the wire required to provide a resistance of 2.82 ohms so that the wiper rest area 22 will have a power density of 0.6 ohms per square inch is determined by using Equation 6.

$$R = KL \qquad \text{Equation (6)}$$

where:

R is the total resistance of the wire 34, in ohms,

K is the resistivity of the wire 34, in ohms per foot, and

L is the length of the wire 34, in feet.

Solving Equation (6) for L, Equation 6 becomes Equation (7).

$$L = R/K \qquad \text{Equation (7)}$$

Referring to *Mark's Standard Handbook for Mechanical Engineers*, 9th Edition, 32 gauge annealed copper wire has a diameter of 0.008 inches (0.203 mm) and a resistivity of 0.167 ohms per foot. Substituting these values of R and K into Equation (7), L is calculated to be 16.9 feet. In forming a pattern with the wire 34 within the wiper rest area 22, it is preferred that adjacent portions of the wire 34 be generally uniformly spaced apart between about 0.25 to 1.0 inches (0.635 to 2.54 cm). Presuming a wire spacing of approximate 0.5 inches (1.27 cm), a pattern using six passes of wire 34 extending across the wiper rest area 22 in a back and forth pattern, as illustrated in FIG. 1, would be needed to cover the 3 inch wide wiper rest area 22. Dividing the total length of wire required to produce the required resistance (16.9 feet) by the number of wire runs (6) results in an estimated length of each run of the wire 34 to be about 34 inches (86.36 cm), which in this example is the approximate length of the wiper rest area 22. If it were determined that the length of each pass of wire 34 was too long or too short, the gauge of the wire and/or the wire spacing may be adjusted accordingly.

From the above, the relationship between the wire size, wire length, wiper rest area to be heated and the pattern density, i.e. the total length of wire within a specific area, is apparent and the design of the wiper area heating arrangement 24 of a desired power density may be dictated by any of these design parameters.

As discussed earlier, it is preferred to keep the wire 34 as close to surface 20 of outer sheet 12 possible to maximize the amount of heat generated along surface 20 of windshield 10 at the wiper rest area 22. In the present invention as disclosed above, the wire 34 may be viewed from the outside of the vehicle into which the windshield 10 is installed, i.e. when viewing through outer glass sheet 12. In those windshield configurations where it is desirable to mask or hide the heating arrangement from view, it is preferred to have the lower portion 30 of the ceramic band 26 extend behind the entire wiper rest area 22. The dark colored background, preferably black, provided by the ceramic band 26 will serve to mask the appearance of the wire 34. It should be appreciated that portion 30 will also prevent wire 34 from being seen from within the vehicle, i.e. when viewing through inner glass sheet 14. To further mask the wire 34 from view from the outside of the vehicle, the wire 34 itself may be colored to generally correspond to the color of the ceramic band 26 positioned behind the heating arrangement 24. Although not limiting in the present invention, in one particular embodiment, the wire 34 is magnet wire and more specifically a copper wire with a black colored polyester-amide-imide insulating coating, available from MWS Wire Industries, Westlake Village, Calif. The black wire 34 used in combination with a black ceramic band 26 serves to mask the heating arrangement 24 when viewed from the outside of the vehicle through outer glass sheet 12. It should be appreciated that if the coating on wire 34 is an insulating coating, there is greater flexibility in the type of pattern that may be formed by the wire to provide the desired power density since the wire may now be crossed within the wire pattern without short circuiting the entire heating system.

It is recognized that certain heating configurations may not require the wire 34 to be hidden by using a darkened wire against a black ceramic paint band. For example, in some vehicles, the windshield extends below the engine hood and the wiper rest area 22 is positioned below the hood line. In this arrangement, the wipers themselves are hidden from view when deactivated. It is also contemplated that automotive stylists may want to accentuate the presence of wire 34. In such a situation, coated or uncoated wire 34 may used to provide a more visible appearance within the windshield 10.

Referring to FIG. 1, wire 34 in heating arrangement 24 is configured such that ends 38 and 40 are closely spaced to each other at connection area 42 along edge 32 of the windshield 10. This arrangement simplifies connection of the heating arrangement 24 to a power source. Unlike arrangements where power is provided through busbars with leads positioned along opposite sides of the windshield, electrical connection of ends 38 and 40 of the wire 34 to a power source 44, e.g. a car battery, may be made at a single location along windshield edge 34. Although not limiting in the present invention, connection of wire 34 to power source 44 may be made at a notch area along an edge of the windshield 10. More specifically, inner glass sheet 14 may include a notch area 46 cut out along edge 32 of the sheet 14 at connection area 42. Ends 38 and 40 extend into the notch area 46 and leads from power source 44 may be connected directly to the wire 34, e.g. by soldering. The entire notch area 46 may then be filled with a nonconductive material, e.g. flexible epoxy, to seal the notch area 46 and protect the connections. As an alternative, the notch area 46 may be eliminated by using a connector (not shown) that is laminated within the windshield 10. More specifically, the connector would include a first portion having electroconductive tabs that overlay ends 38 and 40 of wire 34 within the periphery of the windshield 10 and a second portion that extends beyond the windshield periphery. The first portion of the connector would be aligned with the ends 38 and 40 and laminated between the glass sheets and interlayer of the windshield 10, with the second portion extending outwardly from the windshield 10 to provide a connection to power source 44. As another alternative, ends 38 and 40 of wire 34 may extend outward from edge 32 of windshield 10 at connection area 42 and leads from the power source 44 may be secured directly to the wire ends. With this latter arrangement, the connection to wire ends 38 and 40 should be sealed in any convenient manner to protect the integrity of the connection and prevent shorting of the heating arrangement 24.

The heating arrangement 24 is connected to a controller 48 controls the operation of the heating arrangement, for example as disclosed in U.S. Pat. No. 5,386,098.

Figures 3A, 3B:
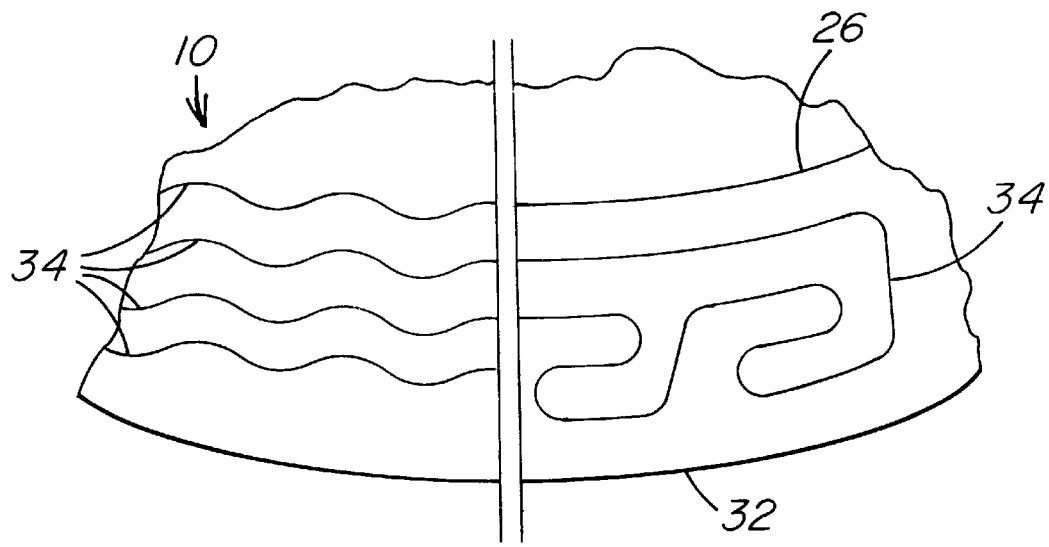
FIGS. 3A and 3B are enlarged plan views of the lower portion of the wiper rest area of a windshield showing alternative patterns for the resistance wire heating element.

Although FIG. 1 illustrates a heating arrangement 24 wherein the wire pattern includes multiple back and forth passes of wire 34 across the lower portion of windshield 10, with each run of the wire being essentially straight and the passes being generally parallel and uniformly spaced from each other, the pattern of wire 34 may be any desired pattern that provides the desired power density within the wiper rest area 22. For example, FIGS. 3A and 3B illustrate other possible wire configurations. In FIG. 3A, wire 34 is configured to include a series of short passes within small areas of the wiper rest area 22 and FIG. 3B shows wire 34 extending through wiper area 22 in a sinusoidal pattern.

In one particular embodiment of the invention, the wire 34 was incorporated into the windshield 10 in a pattern as shown in FIG. 1. The wiper rest area 22 to be heated was approximately 2×56 inches (5.08×142.2 cm) or 112 square inches (723 square cm). The wire 34 was 30 gauge (AWG) copper magnet wire (200° C. thermal class with polyester-amide-imide black insulation, K=0.1037 ohms/foot) and was secured by hand to interlayer 16 along surface 36 to form a pattern that included four generally parallel passes of the wire 34 at a spacing of about 0.5 inches (1.27 cm), with each run of wire 34 being approximately 54 inches (137 cm) long. The total length of wire used was about 18.28 feet (5.57 m) and the measured resistance of the wire 34 was 1.95 ohms resulting in an average power density of about 0.66 watts per square inch (0.102 watts per square cm).

In fabricating windshield 10 discussed above, sheets 12 and 14 were cut to a required shape and ceramic band 26 was screen printed on surface 28 of inner ply 14. The sheets were then joined in overlaying relation and simultaneously heated and shaped by gravity sag bending techniques well known in the art. After cooling, interlayer 16 with wire 34 was positioned between sheets 12 and 14 and the assembly was deaired and laminated using well known windshield laminating techniques. To connect the wire 34 to the power source 48, a notch type connection as discussed earlier was used. More specifically, end 38 and 40 of wire 34 were soldered to the leads of the power source 48 within a notch area 46 cut along the lower edge 32 of the inner glass sheet 14 and the notch area was filled with a flexible epoxy sealant.

Figure 4:
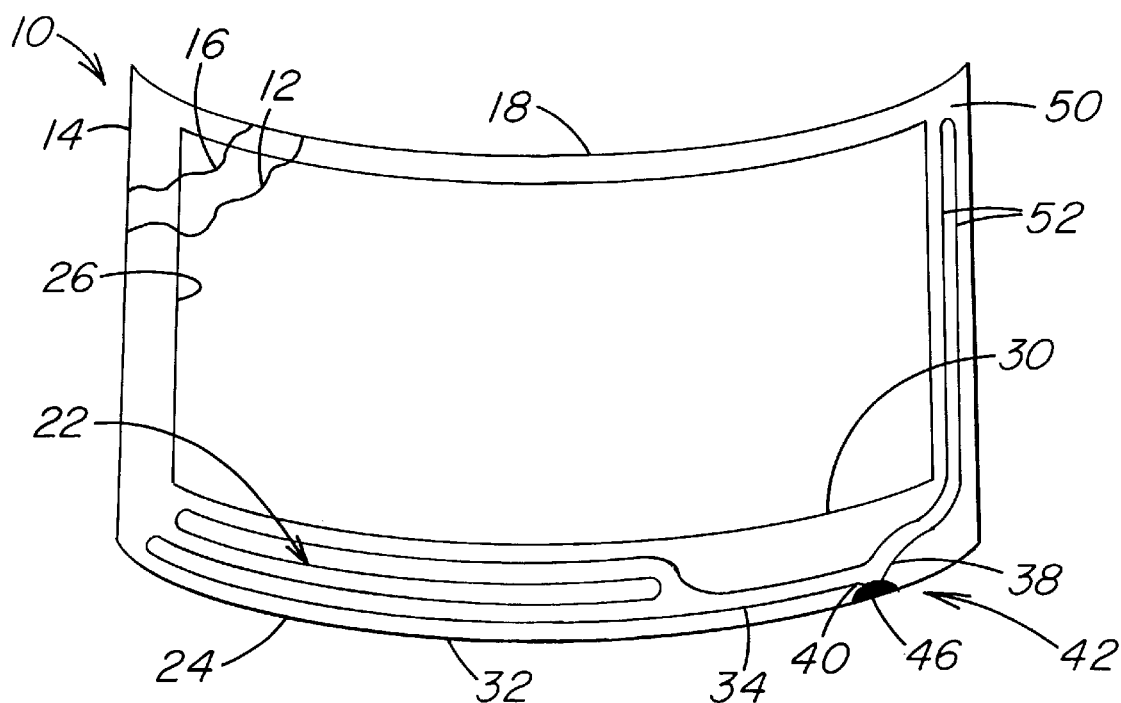
FIG. 4 is a plan view of a windshield including a wiper rest area heating system and an A-post area heating system, with portions removed for clarity.

It is contemplated that the wire 34 may extended within windshield 10 to heat other areas. More particularly, in one embodiment of the invention, the wire 34 is extended to heat the side edge of the windshield 10, typically referred to as the A-post area 50 as illustrated in FIG. 4. The purpose of heating area 50 of the windshield 10 is to prevent accumulation of snow and/or ice along this portion of the windshield 10 as the wipers clear the windshield and push snow and ice either to the side edge or lower edge of the windshield 10. The length of portion 52 of wire 34 heating the A-post area 50 of windshield 10 may be determined using the same design criteria and formulas discussed earlier.

In one particular embodiment of the invention, wire 34 was used to heat both the wiper rest area 22 and the A-post area 50 of windshield 10 with a pattern as shown in FIG. 4. The wiper rest area 22 to be heated was approximately 2×40 inches (5.08×101.6 cm) and the A-post area 50 was 1×24 inches (2.54×61 cm). The wire 34 was 30 gauge copper magnet wire (200° C. thermal class with polyester-amide-imide black insulation, K=0.1037 ohms/foot) and was secured by hand to interlayer 16 along surface 36 to form a pattern within wiper area 22 that included four generally parallel runs of the wire 34 at a spacing of about 0.5 inches (1.27 cm), with each run of wire 34 being approximately 40 inches (101.6 cm) long. Portion 52 of wire 34 extended through the A-post area 50 of the windshield 10 and included 2 generally parallel runs of wire, each approximately 24 inches (61 cm) long and approximately 0.5 inches (1.27 cm) apart. In this particular configuration, the notch area 46 along edge 32 of windshield 10 was spaced about 12 inches (30.5 cm) from the end of the wiper rest area 22. The wire 34 in this area was spaced about 0.5 inches (1.27 cm) so that it heated approximately 12 square inches (77.4 square cm). The total heated area was approximately 116 square inches (748 square cm) and required approximately 20 feet (6.1 m) of wire. The actual measured resistance of the wire 34 was 2.15 ohms resulting in an average power density of about 0.58 watts per square inch (0.089 watts per square cm). As with the example discussed earlier, the end 38 and 40 of wire 34 were soldered to the leads of the power source 44 within a notch area 46 along the edge 32 of the windshield 10.

The use of a single continuous wire 34 in a wiper heating arrangement 24, as discussed herein, provides several advantages over other wiper area heating systems. With respect to systems that use electrically conductive ceramic enamels, the cost for incorporating a wire into the interlayer is typically less than applying the ceramic enamel by a screen printing process. More specifically, the use of a ceramic enamel as the heating elements requires additional screen printing and paint drying operations which will increase the overall processing time and fabrication costs. With the single wire system as disclosed herein, the addition of the wire to selected portions of the interlayer will have little, if any, impact on the windshield assembly and laminating operation. Furthermore, since the ceramic enamel is physically bonded to the glass surface, heating the ceramic enamel may induce stresses along the glass/ceramic interface within the laminated windshield structure. In addition, the present invention does not use a plurality of individual members interconnected by busbars. The incorporation of busbars into the laminate will require additional processing steps and impart additional costs. The wire system also provides for better flexibility. Since the wire 34 is incorporated into the interlayer 16, the desired pattern may be easily changed without affecting the overall windshield processing. More specifically, a new ceramic paste pattern will require a new screen to be fabricated and installed in the screen printing machine. With the single wire arrangement disclosed herein, since the wire 34 is incorporated into interlayer 16 off-line, it will not effect the windshield fabrication operation. It should be noted that there is a limit as to how thin of a line may be screen printed onto a glass surface. It is expected that a printed line width of about 0.0196 inches (0.5 mm) or less may be difficult to apply in a consistent and uniform manner. In the preferred embodiment of the present invention, wire 34 is 28–34 gauge wire which has a diameter ranging from 0.012 to 0.006 inches (0.3 to 0.15 mm) so the heating element will be less visible. Also, since the heating element, i.e. wire 34, is incorporated into the interlayer 16 and not screen printed or coated on the surface of a glass ply, the continuity and integrity of the heating element may be tested prior to incorporating it into the windshield assembly, thereby identifying any defective heating arrangements prior to windshield fabrication and reducing the number of defective windshields. It should also be appreciated that by incorporating the single wire 34 into the interlayer 16, the heating system may be easily handled and will conform to the curved shape of the glass sheets without wrinkling or otherwise effecting the effectiveness of the heating system.

The form of the invention shown and described in this disclosure represents illustrative preferred embodiments and various modifications thereof. It is understood that various changes may be made without departing from the spirit of the invention as defined by the claimed subject matter which follows.

We claim:

1. A laminated vehicle windshield comprising:
   a first glass sheet;
   a second glass sheet;
   an interlayer positioned between said first and second sheets, wherein said interlayer secures said first sheet to said second sheet;
   a single, continuous resistance heating wire secured between said sheets and making multiple passes through a lower portion of said windshield generally corresponding to an expected wiper rest area such that said wire generates a desired power density within said lower portion; and
   a common connection area positioned along an edge of said windshield wherein opposing first and second ends of said wire are closely spaced to each other and extend to said common connection area.

2. The transparency as in claim 1 further including means to provide for electrical connection of said first and second ends of said wire to a power supply at said connection area.

3. The transparency as in claim 2 wherein said first and second ends of said wire extend beyond an edge of said transparency at said connection area.

4. The transparency as in claim 2 wherein said first and second ends of said wire terminate at a sealed notch area positioned at said connection area.

5. The transparency as in claim 1 wherein said wire is selected from the group consisting of copper, stainless steel, zinc, aluminum, tungsten, nichrome, nickel, gold, silver and alloys thereof.

6. The transparency as in claim 5 wherein said wire includes a coating.

7. The transparency as in claim 6 wherein said wire is copper magnet wire.

8. The transparency as in claim 5 wherein said wire is a gauge of about 28 to 34 gauge (AWG).

9. The transparency as in claim 1 wherein said wire generates a power density within said predetermined portion of about 0.3 to 1 watts per square inch.

10. The transparency as in claim 9 wherein said wire generates a power density within said predetermined portion of about 0.5 to 0.7 watts per square inch.

11. The transparency as in claim 9 wherein said multiple passes of said wire are generally parallel and uniformly spaced from each other.

12. The transparency as in claim 1 wherein said wire is generally in direct contact with a major surface of said first ply within said predetermined portion.

13. The transparency as in claim 1 wherein said wire is embedded within said interlayer within said predetermined portion.

14. The transparency as in claim 1 wherein said predetermined portion further includes a marginal edge portion of said transparency generally corresponding to an A-post area of said windshield and further wherein a portion of said wire makes multiple passes through said marginal edge portion.

15. The transparency as in claim 1 further including an opaque ceramic band positioned along a marginal edge portion of said second sheet such that said wire is not visible when said transparency is viewed through said second sheet.

16. The transparency as in claim 15 wherein said wire includes a coating having a color that generally corresponds to the color of said opaque ceramic band.

17. The transparency as in claim 16 wherein said opaque band is a black colored band and said wire is 28 to 34 gauge (AWG) copper magnet wire with a black colored coating.

18. The transparency as in claim 17 wherein said wire is generally in direct contact with said first major surface of said first glass sheet within said predetermined portion and said wire generates a power density within said predetermined portion of about 0.3 to 1 watts per square inch.

19. The transparency as in claim 18 wherein said predetermined portion further includes a marginal edge portion of said transparency generally corresponding to an A-post area of said windshield and further wherein a portion of said wire makes multiple passes through said marginal edge portion.

20. A windshield for a vehicle having windshield wipers which reside on an outer surface of said windshield at a wiper rest area when said wipers area deactivated, said windshield comprising:
   a first glass sheet having first and second major surfaces;
   a second glass sheet having first and second major surfaces;
   an interlayer positioned between said first and second sheets to secure said first major surface of said first sheet to said first major surface of said second sheet to form said windshield, wherein said second major surface of said first sheet is said outer surface of said windshield and said second major surface of said second sheet forms an inner surface of said windshield;
   a single, continuous copper magnet wire of about 28 to 34 gauge (AWG) secured between said sheets and making multiple passes through a lower portion of said windshield generally corresponding to said wiper rest area, said multiple runs forming a pattern such that said wire generates a power density of about 0.3 to 1 watts per square inch to heat said wiper rest area;
   a common connection area positioned along an edge of said windshield wherein opposing first and second ends of said wire are closely spaced to each other and extend to said common connection area;
   means connected to said first and second ends of said wire to provide external electrical access to said wire; and
   an opaque ceramic band along a marginal edge portion of said second major surface of said second sheet, wherein said band extends beyond said wire such that said wire is not visible when said windshield is viewed through said second sheet.

21. The windshield as in claim 20 wherein said predetermined portion further includes a marginal edge portion of said windshield generally corresponding to an A-post area of said windshield and further wherein a portion of said wire makes multiple passes through said marginal edge portion.

22. A method of manufacturing a windshield for a vehicle having a heating-arrangement to heat a portion of an outer surface of said windshield which generally corresponds to a wiper rest area, comprising the steps of:
   securing a single, continuous resistance heating wire to a thermoplastic interlayer in a predetermined pattern generally corresponding to said wiper rest area and which generates a desired power density within said pattern to heat said wiper rest area;

extending first and second opposing ends of said wire to a common area of said interlayer such that said first and second ends are closely spaced to each other at said common area;

positioning said interlayer between a first glass sheet and a second glass sheet such that said pattern is aligned with said wiper rest area and said first and second ends of said wire are aligned with a desired connection area of said windshield; and laminating said first and second sheet and said interlayer to secure said wire between said first and second sheets to form said windshield.

23. The windshield as in claim 22 further including the step of providing external electrical access to said first and second ends of said wire at said connection area.

24. The windshield as in claim 22 further including the step of bonding an opaque ceramic band along a marginal edge portion of a major surface of said second sheet, wherein said band extends beyond said predetermined pattern such that said wire is not visible when said windshield is viewed through said second sheet.

25. The windshield as in claim 22 wherein said securing step includes the step of securing a copper magnet wire of about 28 to 34 gauge (AWG) to said interlayer and said predetermined pattern generates a power density of about 0.3 to 1 watts per square inch.

26. A laminated vehicle windshield comprising:

a first glass sheet;

a second glass sheet;

an interlayer positioned between said first and second sheets, wherein said interlayer secures said first sheet to said second sheet;

a single, continuous resistance heating wire of about 28 to 34 gauge (AWG) secured between said sheets and making multiple passes through a lower portion of said windshield generally corresponding to an expected wiper rest area such that said wire generates a power density of about 0.3 to 1 watts per square inch within said lower portion; and a common connection area positioned along an edge of said windshield wherein opposing first and second ends of said wire extend to said common connection area.

* * * * *